March 25, 1930. L. FLESCHER 1,751,986
ROTARY VALVE MECHANISM
Filed June 10, 1929 6 Sheets-Sheet 4
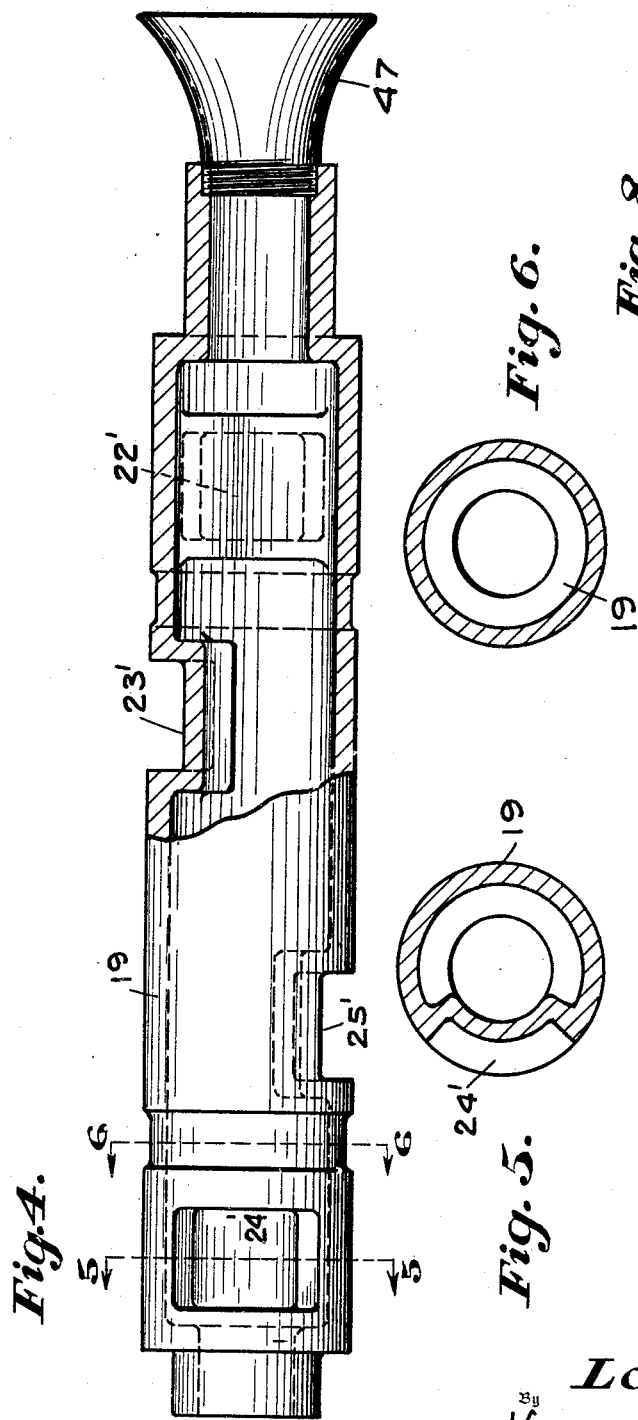
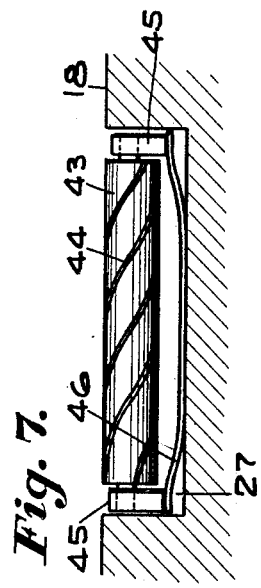
Inventor
*Louis Flescher*
By *Hiram A. Sturges*
Attorney

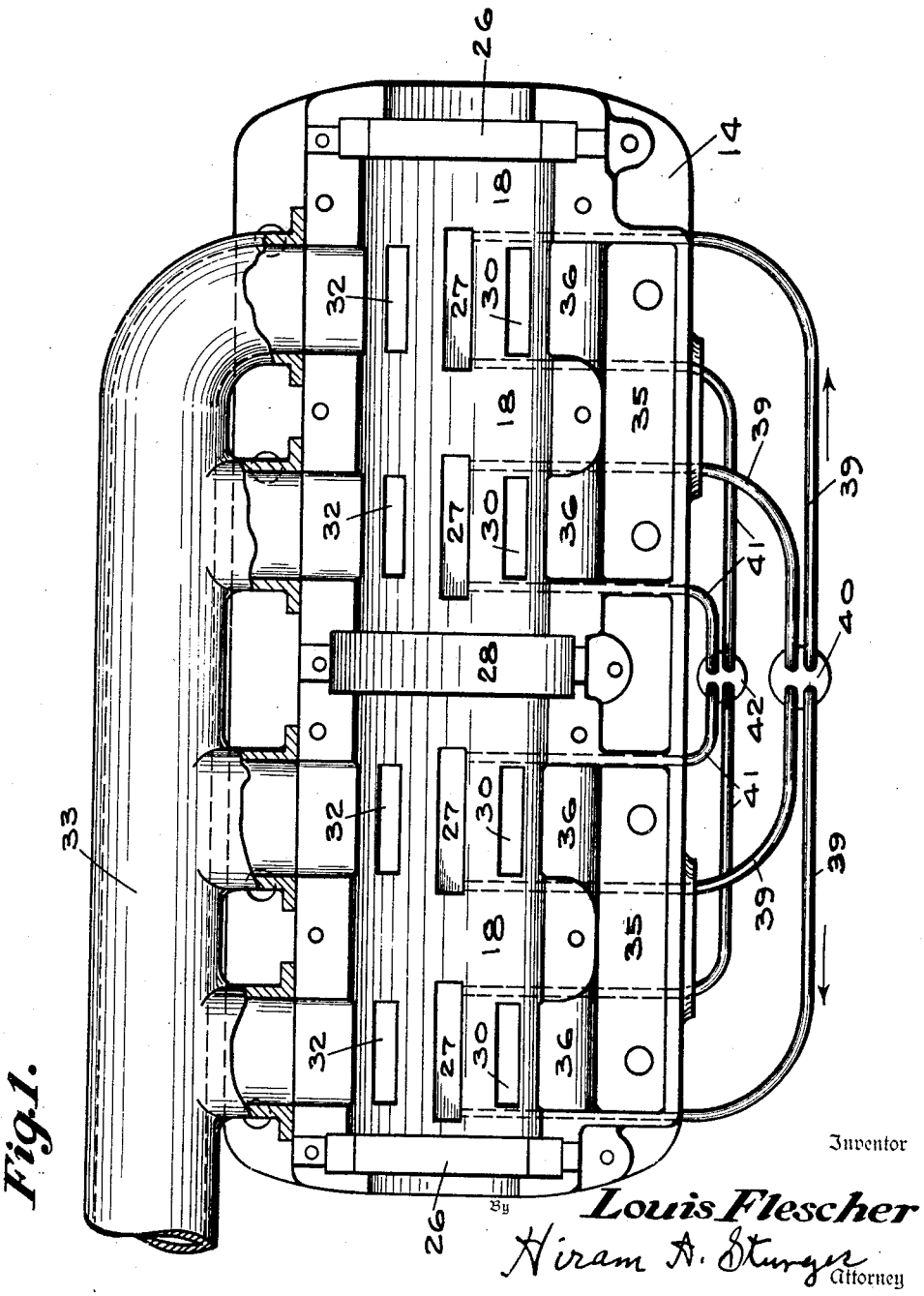

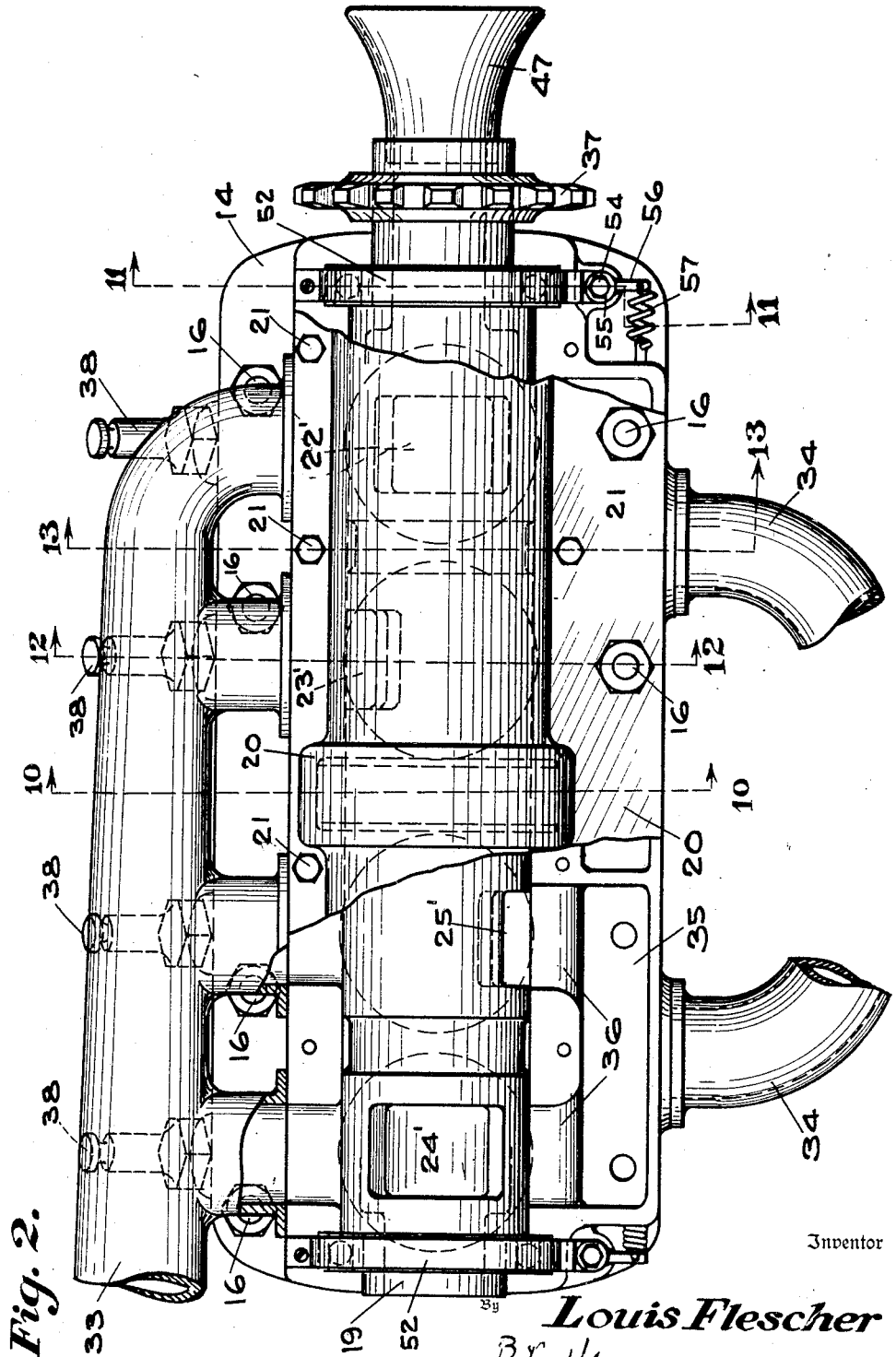

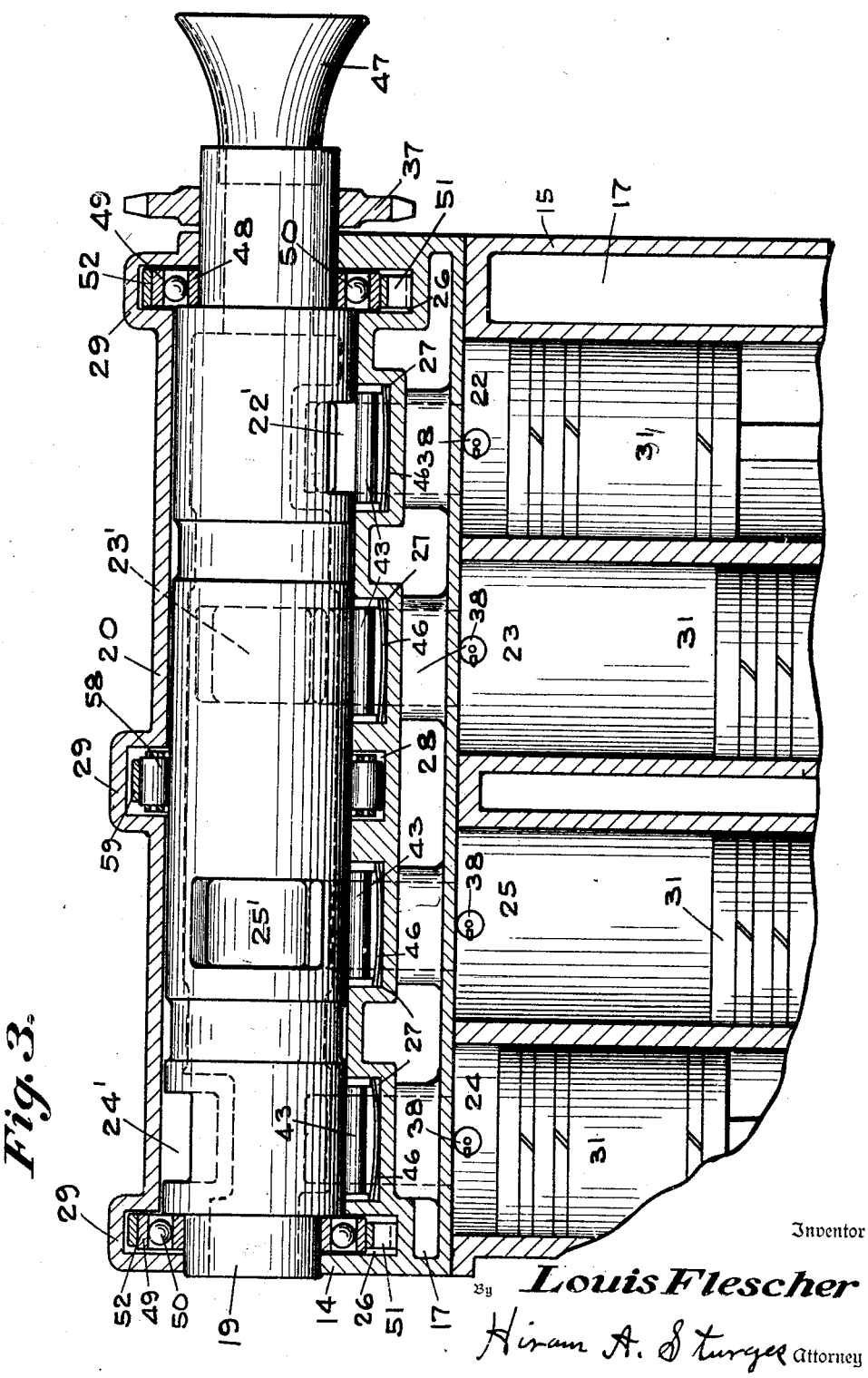

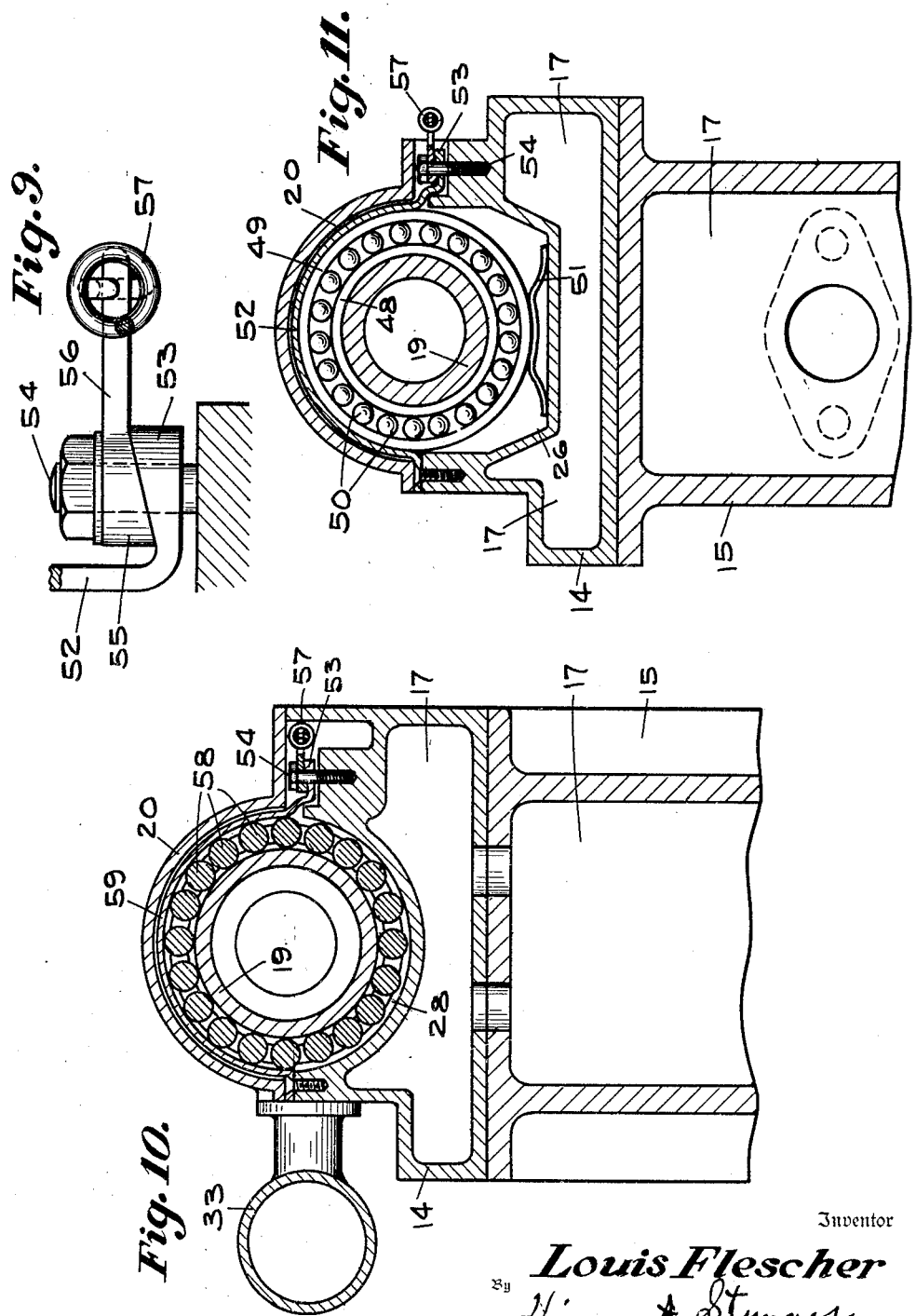

March 25, 1930.     L. FLESCHER     1,751,986
ROTARY VALVE MECHANISM
Filed June 10, 1929     6 Sheets-Sheet 6
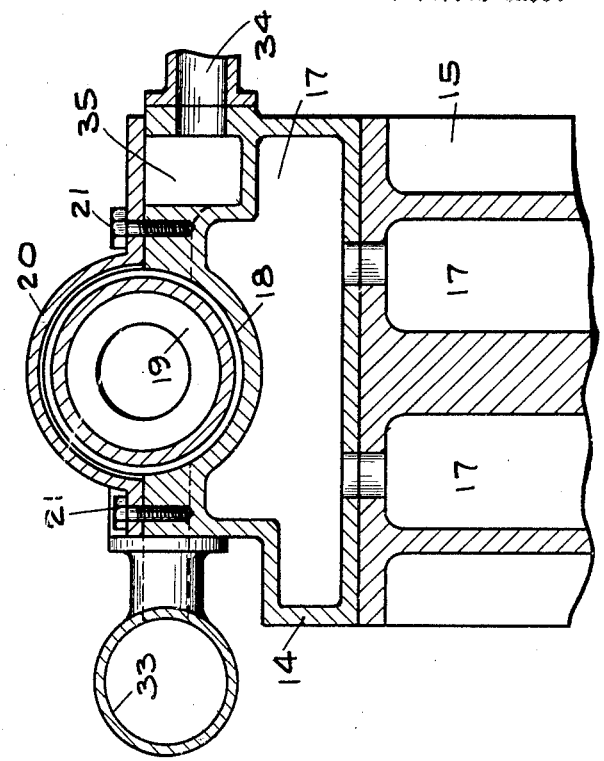
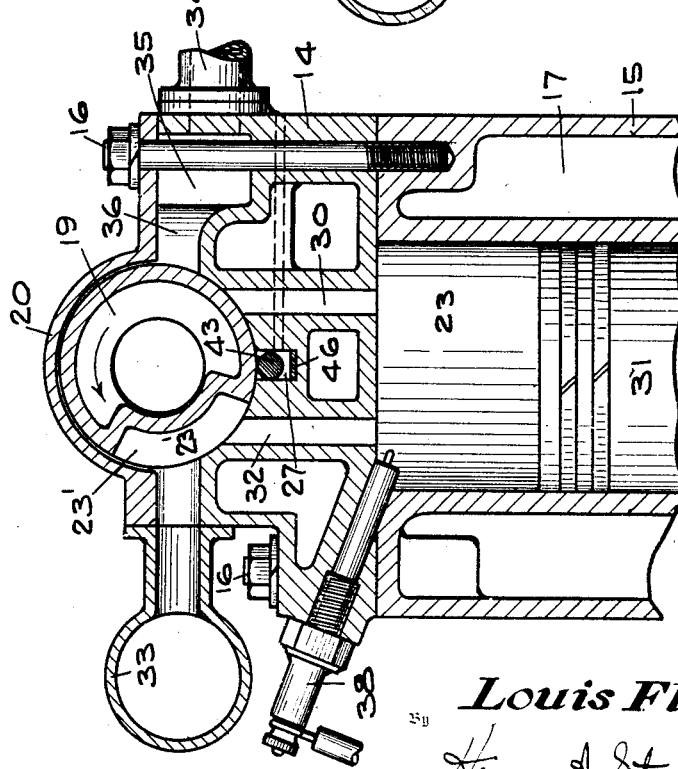
Inventor
*Louis Flescher*
By *Hiram A. Sturges* Attorney Patented Mar. 25, 1930

1,751,986

UNITED STATES PATENT OFFICE

LOUIS FLESCHER, OF WINNER, SOUTH DAKOTA, ASSIGNOR OF ONE-HALF TO MORRIS LEVEY, OF OMAHA, NEBRASKA

ROTARY VALVE MECHANISM

Application filed June 10, 1929. Serial No. 369,635.

This invention relates to a rotary valve and more particularly to a rotary valve mechanism for an internal combustion engine actuated by intermittent gas explosions, the number of cylinders employed not being important for rotating the crank shaft.

One of the objects of the invention is to provide such a bearing for the valve that it will rotate smoothly and without appreciable vibration.

Another object is to supply lubrication so that it will reach every part of the valve having a bearing. A further object is to provide such an arrangement of the pockets of the valve and ports of the valve-casing that no leakage of the gas will occur.

It is an object of the invention to provide such a construction that the rotatable hollow valve will not absorb heat in a degree sufficient to interfere with operation.

The invention has for one of its objects to provide rotary valve mechanisms of the class mentioned which will consist of few and simple parts so that it may be produced at a moderate expense.

With the foregoing objects in view and others to be mentioned the invention presents a new and useful construction, combination and arrangement of parts as described herein and claimed, and as illustrated in the accompanying drawings, it being understood that changes may be made in form, size, proportion of parts and minor details, said changes being within the scope of the invention as claimed.

In the drawing, Fig. 1 is a plan view of the cylinder head, the valve-cup being removed to clearly show the parts of the valve-seat, the exhaust-pipe and supply-pipes for lubrication being added. Fig. 2 is a view similar to that shown in Fig. 1 the valve-cap being shown partly broken away to show the valve, a pair of intake pipes for gas being shown.

Fig. 3 is a view in longitudinal section through the cylinder head, valve-seat and valve-cap, the cylinders being broken away.

Fig. 4 is a side or plan view of the valve, parts being in section. Fig. 5 is a sectional view on line 5—5 of Fig. 4. Fig. 6 is a sectional view on line 6—6 of Fig. 4. Fig. 7 is a side view of a resiliently mounted oil-distributor. Fig. 8 is a plan view of the same. Fig. 9 is a side view of a compressor or adjusting device for taking up the wear of the bearings for the valve. Fig. 10 is a sectional view on line 10—10 of Fig. 2. Fig. 11 is a sectional view on line 11—11 of Fig. 2. Fig. 12 is a transverse section on line 12—12 of Fig. 2. Fig. 13 is a sectional view on line 13—13 of Fig. 2.

Referring now to the drawing for a more particular description, the invention is shown and described in connection with the cylinder-head 14 mounted upon the cylinder block 15 and secured thereto by bolts 16, the water jacket being indicated at 17.

The cylinder-head is provided with a trough or valve-seat 18 for the hollow valve 19.

Numeral 20 indicates a cap semi-circular in cross-section and by means of bolts 21 it may be secured to the cylinder-head.

The valve may have any suitable length and the number of cylinders used is not important, in the present instance four cylinders being shown and respectively indicated at 22, 23, 24 and 25.

The valve-seat 18 is semi-circular in cross-section to provide a very accurate fitting for the surface of the valve. It is provided near the ends as best shown in Fig. 1 with depressions 26 for receiving certain bearings for the valve. Also the valve-seat 18 is provided with oil-chambers or recesses 27 and, approximately midway between its ends, is provided with a semi-circular groove 28 for receiving certain stabilizing elements to be described.

The cap 20 is provided with semi-circular grooves 29 opening on its concave side, and when the cap has been mounted in its normal position its grooves 29 will be disposed in register with the depressions 26 and 28 of the valve-seat.

As best shown in Fig. 1 the valve-seat is provided with ports 30 to permit gas to enter the cylinders 22, 23, 24, and 25 by the suction strokes of the pistons 31. Also the valve-seat 18 is provided with ports 32 to permit exhaust gases to move outwardly from the cylinders into the exhaust pipe 33 by the exhaust strokes of the pistons.

The four pockets or recesses for the valve are indicated respectively at 22', 23', 24' and 25'. Numerals 34 indicate a pair of intake pipes leading from a carburetor (not shown), each pipe 34 operating to conduct gas to a chamber 35 (Fig. 2) and from thence to a pair of passageways 36 for a communication with a pair of pockets of the valve 19.

While only one gas chamber 34 has been shown in the broken away Fig. 2 of the drawing it will be understood that each gas pipe 34 is in communication with a chamber 35 and pair of gas passageways 36, the arrangement being that hydrocarbon may enter the pockets 22', 23', 24' and 25' from said passageways 36 during the rotatable movements of said valve 19.

Numeral 37 indicates a sprocket wheel carried by the valve 19, said wheel being provided with a chain having a suitable connection with the crank shaft (not shown) of the engine so that the valve will have a complete rotation by action of the crank shaft while the latter completes two rotations.

The pockets or recesses in the valve 19 are disposed in pairs diametrically opposite to each other, that is to say the pockets 22' and 24' are opposite to each other and the pockets 23' and 25' are opposed to each other. The spark plugs for the cylinders are indicated at 38.

In operation, while the piston in cylinder 22 is making its suction stroke the pocket 22' of the valve 19 will be in communication with a gas passageway 36 and a gas intake port 30 to permit the hydrocarbon to enter said cylinder 22. During the compression stroke of said cylinder the valve 19 will rotate 90 degrees and the smooth surface of the valve will obstruct the upper end of this cylinder and will prevent any escape of gas during said compression. The piston in said cylinder 22 will next move downwardly, this being the explosion stroke and during this movement of the piston the valve 19 will also present a smooth surface to the upper end of said cylinder 22 to prevent any escape of gas. The exhaust stroke of the piston in said cylinder will be upward to expel the burned gas and during this upward stroke the pocket 22' will be in communication with an exhaust port 32 to permit the burned gas to enter the exhaust pipe 33, the direction of rotation for said valve being indicated by the arrow in Fig. 12 of the drawings.

Having described the movements of the piston in the cylinder 22, and the communication of the pocket 22' with a gas intake port and an exhaust port operating with this cylinder, a description of the movements of the pistons in cylinders 23, 24 and 25 in connection with the rotation of the valve 19 is not considered necessary, it being understood that during each rotation of the valve 19 each of its pockets will receive gas from a passageway 36 and will deliver exhaust gases to the pipe 33 in succession for actuation of a crank shaft.

Since the valve 19 should be lubricated throughout its entire length, means are provided for this purpose. Oil may enter the several chambers 27 of the valve-seat 18 through the supply pipes 39 communicating with an oil supply conduit 40, return-pipes 41 being in communication with said chambers 27 and with a return conduit 42, and by means of an oil-pump (not shown) the oil is moved to said chambers or recesses 27 for the purposes of lubrication and all excess oil is returned to the pump.

In order that the oil will be deposited on the surface of the valve 19 a plurality of rollers 43 are employed and are mounted in the chambers or recesses 27. These rollers are preferably provided with spiral grooves 44 (Figs. 7, 8) as an aid in distributing the oil, their ends having pivotal mountings in bearing-blocks 45. Numerals 46 indicate springs, and each pair of blocks 45 is pressed upwardly by a spring 46.

It will thus be seen that a considerable part of the surface of the valve 19 is engaged by the rollers 43, and in operation, oil will spread to the remaining curved surfaces of the valve so that lubrication will be complete.

Numeral 47 indicates a funnel which is provided for the front end of the hollow valve 19, and since the funnel may be disposed adjacent to and rearwardly of the fan (not shown) which is usually employed, fresh air may pass through the hollow valve. However I do not wish to be understood as limiting myself to the use of air for preventing excessive heat of the metallic parts employed, and the temperature for the valve may be controlled by use of moving liquids if desired.

It is understood that the valve and its seat may become worn from use, and since the valve should make a complete closure of the ports 30 and 32 at the compression and explosion strokes of the pistons, means are provided for causing a downward pressure of the valve upon its seat.

The means for this last named purpose are located at or near the ends of the valve and also midway between its ends. Since the means at the ends of the valve are identical for this purpose as compared with each other a description of one is considered sufficient.

As best shown in Figs. 3 and 11 of the drawings, the valve 19 is provided at each of its ends with a ring 48. A second pair of rings 49 are provided each being disposed outwardly of a ring 48 a sufficient distance to provide a mounting for a plurality of roller-balls 50 therebetween. Numeral 51 indicates a pair of springs, each being disposed in a depression 26 and tending to prevent a downward pressure of the ring 49 and parts carried thereby and tending to resist stresses directed downwardly to an end-portion of the valve 19. Numerals 52 indicate a pair of straps each being arranged to press a ring 49 downwardly, one end of each strap being secured to a bolt 21 at one side of the valve 19 as best shown in Fig. 11, its opposite end being provided with a lug 53 slidably mounted on a bolt 54.

A second lug indicated at 55 (Fig. 9) is slidingly mounted on the bolt 54 and is provided with an arm 56. Numeral 57 indicates a spring, and as shown in Fig. 2 of the drawings, one end of this spring is mounted on a part of the cylinder head, its opposite end being connected with the arm 56.

Since the inner walls of the lugs 53 and 55 are disposed inclinedly relative to each other a swinging movement of the arm 56 in either direction will cause a downward sliding movement of the lug 53 on the bolt 54, the strap 55 being moved downwardly to press the ring 49 downwardly against the force of the first named spring 51.

The operation of the spring 57, last described, is to take up any slack occasioned by wear of the rings 48 and 49 which provide the raceway for the roller-balls. If these parts become worn in an appreciable degree the spring 57 will cause the arm 56 to swing outwardly for maintaining the strap 52 in engagement with the ring 49, said strap operating to exert a downward pressure in opposition to the upward pressure exerted by the spring 51. However, the straps are of such proportion that they maintain the valve in actual contact with the bottom of the valve-seat, and the springs 51 tend to prevent vibration during the explosion strokes of the pistons.

As best shown in Figs. 3 and 10 of the drawings the valve 19 is supported midway between its ends by rollers 58 which operate in the depression 28 of the valve-seat 18, a strap 59 operating to press the rollers and valve downwardly. If the valve-seat or valve becomes worn by action of the rollers, the strap will be adjusted automatically for maintaining the valve at its lowermost position, the same arrangement of lugs 53 and 55 slidingly mounted on bolt 54, an arm 56 and spring 57 already described being provided.

I claim as my invention,—

1. In a rotary valve for internal combustion engines, a cylinder-head above the cylinders having an elongated valve-seat provided longitudinally with gas intake ports to the cylinders and exhaust outlet ports from the cylinders and provided longitudinally with depressions, a hollow valve revolubly mounted on the valve-seat and having pockets opening on its periphery for registering with the ports of the valve-seat, a cap mounted on the cylinder head for covering the valve, conduits for conducting lubricants to the depressions of the valve-seat, conduits for conducting lubricants from said depression, and a plurality of rollers in said depressions each engaging said valve.

2. In a rotary valve for internal combustion engines, a cylinder head disposed above the cylinders and provided with a valve-seat having transversely disposed depressions at its ends, longitudinally disposed depressions between its ends, and ports leading to the cylinders, a valve provided near its ends with annular ridges and having pockets opening on its periphery, said valve being mounted on the valve-seat with its annular ridges disposed in the transverse depressions of said valve-seat and being rotatable to dispose its pockets in register with said ports, a cap covering said valve and secured to the cylinder head, mechanism between said cap and annular ridges of said valve for pressing the latter upon its seat, rollers in the longitudinal depressions of the valve-seat in contact with said valve, and a plurality of pipes for conducting lubricants to the longitudinal depressions of the valve-seat and pipes for conducting lubricants from said last named depressions.

3. In a rotary valve for internal combustion engines, a cylinder head having an elongated valve-seat provided with ports leading to the cylinders and provided with depressions, a valve having pockets opening on its periphery and rotatable on the valve-seat to dispose its pockets in register with said ports, a cap secured to the cylinder head and disposed on said valve, rollers in said depressions, springs in the depressions for urging the rollers into contact with the valve, conduits for conducting oil to said depressions, and conduits for conducting oil from the depressions.

4. In a rotary valve for an internal combustion engine, a cylinder head having a valve-seat provided with ports communicating with the cylinders and having depressions, a valve having pockets opening on its periphery and rotatable on the valve-seat to dispose its pockets in communication with said ports, a cap covering said valve, bearing-blocks in said depressions, rollers having spiral grooves and pivotally mounted in the bearing-blocks, springs engaging the bearing-blocks normally pressing the rollers into engagement with the valve, conduits for conducting lubricants to said depressions and conduits for removing lubricants from said depressions.

5. In a rotary valve for internal combustion engines, a cylinder head above the cylinders having transversely disposed depressions near its ends and ports communicating with the cylinders, a valve having pockets opening on its periphery and provided with annular ridges near its ends and revolubly mounted on the valve-seat for disposing its pockets in register with the ports of the valve-seat, a pair of rings each disposed outwardly of the annular ridge of said valve, friction-balls between and engaging said rings and annular ridges, springs in said transversely disposed depressions for normally pressing the valve upwardly from the valve-seat, straps engaging said rings and arranged to press the valve upon its seat against the force of said springs, and a cap secured to the cylinder head and covering said valve.

6. In a rotary valve for internal combustion engines, a cylinder head above the cylinders having a valve-seat and having gas ports and exhaust ports communicating with the cylinders and provided with depressions, gas supply pipes communicating with the valve-seat, an exhaust pipe communicating with the valve-seat, a valve having pockets opening on its periphery and arranged to be rotated for disposing its pockets in alternation in register with said gas ports and exhaust ports, a cap covering the valve, resiliently mounted rollers in said depressions in engagement with the valve, conduits for delivering lubricants to the depressions, conduits for removing lubricants from the depressions, and means for pressing the valve upon the valve-seat.

7. In a rotary valve for internal combustion engines, a cylinder head above the cylinders having gas chambers and provided with an elongated valve-seat communicating with said gas chambers, said valve-seat having gas ports and exhaust ports communicating with said cylinders, and provided with depressions, an elongated valve having pockets opening on its periphery and arranged to be rotated to permit communications of its pockets with the gas chambers of the cylinder head and gas ports and exhaust ports of the valve-seat, a cap for covering said valve, an exhaust pipe for a communication with said valve-seat, gas supply-pipes communicating with the gas chambers of the cylinder head, pivotally mounted rollers in the depressions of the valve-seat, springs in said depressions for maintaining the rollers in contact with the valve, pipes for conducting lubricants to said depressions, pipes for conducting lubricants from said depressions, and means for pressing the valve upon the valve-seat.

In testimony whereof, I have affixed my signature.

LOUIS FLESCHER.